(12) United States Patent
Lee

(10) Patent No.: US 12,212,407 B2
(45) Date of Patent: Jan. 28, 2025

(54) NETWORK SWITCH AND CIRCUIT BOARD WHERE PRECISION TIME PROTOCOL MODULE IS USED

(71) Applicant: Accton Technology Corporation, Hsin-Chu (TW)

(72) Inventor: Kuan-Tse Lee, Hsin-Chu (TW)

(73) Assignee: Accton Technology Corporation, Hsin-Chu (TW)

( * ) Notice: Subject to any disclaimer, the term of this patent is extended or adjusted under 35 U.S.C. 154(b) by 197 days.

(21) Appl. No.: 17/993,986

(22) Filed: Nov. 24, 2022

(65) Prior Publication Data
US 2023/0171016 A1   Jun. 1, 2023

Related U.S. Application Data

(60) Provisional application No. 63/283,536, filed on Nov. 29, 2021.

(51) Int. Cl.
*H04J 3/06* (2006.01)
(52) U.S. Cl.
CPC .......... *H04J 3/0667* (2013.01); *H04J 3/0641* (2013.01)
(58) Field of Classification Search
CPC .............................. H04J 3/0667; H04J 3/0641
See application file for complete search history.

(56) References Cited

U.S. PATENT DOCUMENTS

| | | | |
|---|---|---|---|
| 8,664,996 B2 | 3/2014 | Kuo | |
| 8,964,790 B2 * | 2/2015 | Saito | H04J 3/0697 370/503 |
| 9,813,173 B2 * | 11/2017 | Achanta | H04J 3/0644 |
| 11,108,400 B1 * | 8/2021 | Armstrong | H03L 7/1976 |
| 11,239,934 B2 * | 2/2022 | Beardsley | H04Q 11/0005 |
| 11,546,073 B2 * | 1/2023 | Lin | H04J 3/0641 |
| 11,652,561 B2 * | 5/2023 | Leong | H04J 3/0667 370/350 |
| 2014/0286357 A1 * | 9/2014 | Shenoi | H04J 3/0688 370/503 |
| 2018/0059712 A1 * | 3/2018 | Kazehaya | G06F 1/12 |
| 2018/0159542 A1 * | 6/2018 | Spijker | H03L 7/0991 |
| 2018/0343183 A1 * | 11/2018 | Pope | G06F 13/1689 |
| 2020/0358907 A1 * | 11/2020 | Liu | H04J 3/0667 |
| 2021/0367696 A1 * | 11/2021 | Lin | H04J 3/0641 |

FOREIGN PATENT DOCUMENTS

CN   103186164 A   7/2013

* cited by examiner

*Primary Examiner* — Bailor C Hsu
(74) *Attorney, Agent, or Firm* — Winston Hsu

(57) ABSTRACT

A network switch can include a precision time protocol (PTP) module and a circuit board. The PTP module can provide a first clock signal and include a predetermined interface. The circuit board can include a socket, an oscillator and a selection unit. The socket can be inserted by the predetermined interface to receive the first clock signal. The oscillator can provide a second clock signal. The selection unit can include a first terminal, a second terminal, an output terminal and a selection terminal. The first terminal can receive the first clock signal when the predetermined interface is inserted into the socket. The second terminal can receive the second clock signal. The output terminal can output one of the first clock signal and the second clock signal. The selection terminal can receive a selection signal to control the output terminal to output the first clock signal or the second clock signal.

15 Claims, 4 Drawing Sheets

NETWORK SWITCH AND CIRCUIT BOARD WHERE PRECISION TIME PROTOCOL MODULE IS USED

CROSS REFERENCE TO RELATED APPLICATIONS

This application claims the benefit of U.S. Provisional Application No. 63/283,536, filed on Nov. 29, 2021. The content of the application is incorporated herein by reference.

BACKGROUND OF THE INVENTION

1. Field of the Invention

The application is related to a network switch and a circuit board, and more particularly, a network switch and a circuit board where a pluggable precise time protocol module is used.

2. Description of the Prior Art

In a traditional Ethernet network architecture, signals can be asynchronous for related control. According to the network protocols of the Ethernet network, controls can be performed through a retry mechanism. However, for high-speed transmission, such as 5G communications and 6G communications, the abovementioned traditional asynchronous mechanism is no longer usable. For the high-speed transmission, solutions of precise synchronous control are required to meet the needs of telecommunications.

However, if the hardware for precise synchronization control, such as the electronic components related to the precision time protocol (PTP), is installed indiscriminately in the devices of telecommunication, the hardware cost will be excessive, and the hardware design will be too complex. In addition, network devices for some application scenarios do not have to perform precise synchronization control. If the abovementioned hardware of precise synchronization control is not applicable, it is necessary to additionally design the hardware that is not used for precise synchronization control. For example, a circuit board that is not used for precise synchronization protocols should be designed separately. This will increase the time and cost for designing the hardware. Regarding the applications of the circuit boards, there is no general-purpose circuit board that can support both a precision time protocol and a non-precision time protocol.

Regarding the above problems, solutions for supporting synchronous control and asynchronous control to reduce the difficulty of operation and design are still in need in the field.

SUMMARY OF THE INVENTION

An embodiment provides a network switch including a precision time protocol module and a circuit board. The precision time protocol module is used to provide a first clock signal, and includes a predetermined interface. The circuit board includes a socket, an oscillator and a selection unit. The socket is used to be inserted by the predetermined interface to receive the first clock signal. The oscillator is used to provide a second clock signal. The selection unit includes a first terminal, a second terminal, an output terminal and a selection terminal, where the first terminal is used to receive the first clock signal when the predetermined interface is inserted into the socket, the second terminal is used to receive the second clock signal, the output terminal is used to output one of the first clock signal and the second clock signal, and the selection terminal is used to receive a selection signal to control the output terminal to output the first clock signal or the second clock signal.

Another embodiment provides a circuit board including a socket, an oscillator and a selection unit. The socket is used to be inserted by a predetermined interface of a precision time protocol module to receive a first clock signal. The oscillator is used to provide a second clock signal. The selection unit includes a first terminal, a second terminal, an output terminal and a selection terminal, where the first terminal is used to receive the first clock signal when the predetermined interface is inserted into the socket, the second terminal is used to receive the second clock signal, the output terminal is used to output one of the first clock signal and the second clock signal, and the selection terminal is used to receive a selection signal to control the output terminal to output the first clock signal or the second clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
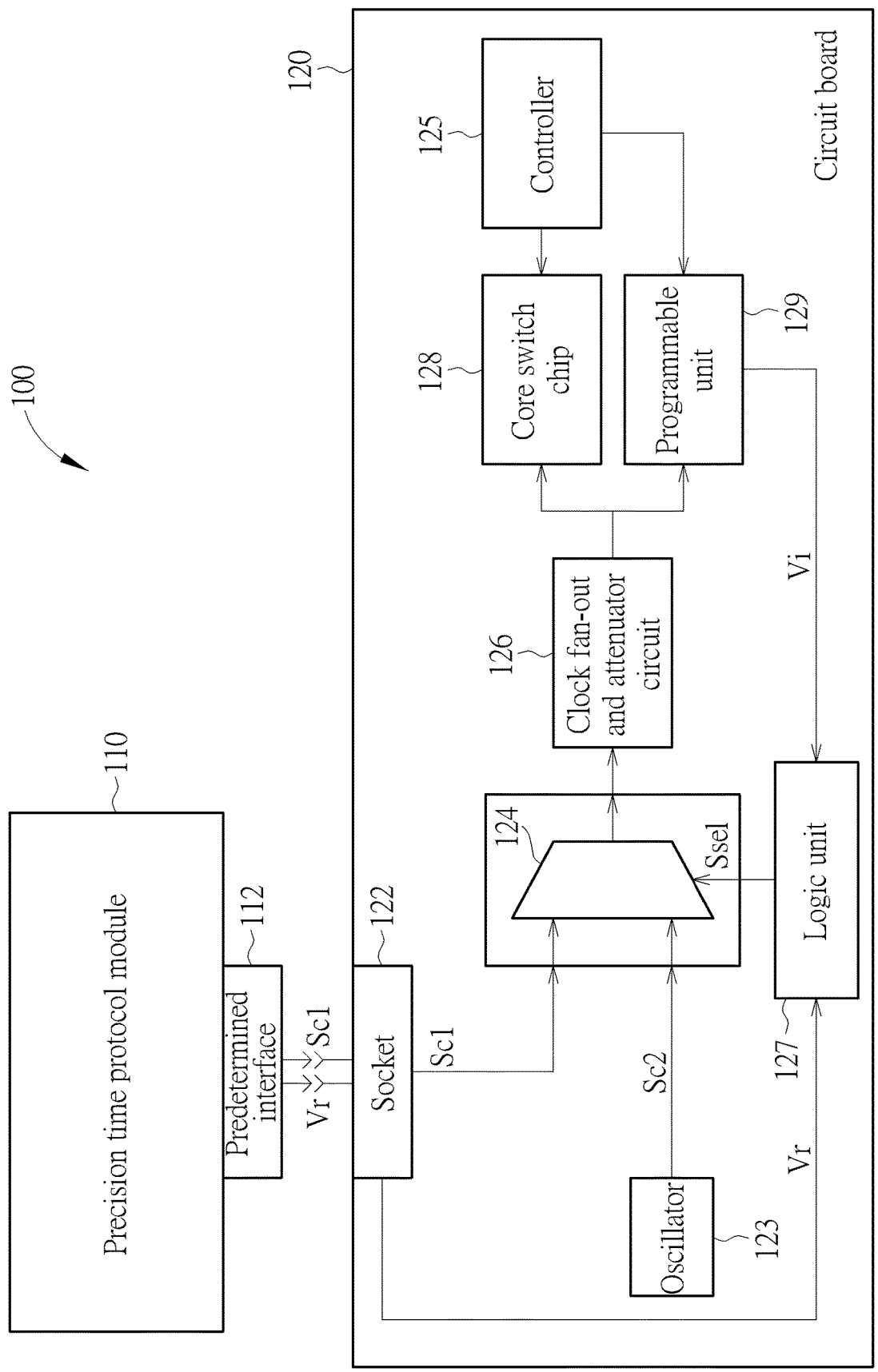
FIG. 1 illustrates a network switch according to an embodiment.

FIG. 1 illustrates a network switch 100 according to an embodiment. The network switch 100 can include a precision time protocol (PTP) module 110 and a circuit board 120. The precision time protocol module 110 can include a predetermined interface 112 and be used to provide a first clock signal Sc1. For example, the circuit board 120 can include a printed circuit board (PCB) and components disposed on the printed circuit board. The circuit board 120 can include a socket 122, an oscillator 123 and a selection unit 124. The socket 122 can be used to be inserted by the predetermined interface 112 to receive the first clock signal Sc. The oscillator 123 can be used to provide a second clock signal Sc2. The selection unit 124 can include a first terminal, a second terminal, an output terminal and a selection terminal, where the first terminal is used to receive the first clock signal Sc1 when the predetermined interface 112 is inserted into the socket 122, the second terminal is used to receive the second clock signal Sc2, the output terminal is used to output one of the first clock signal Sc1 and the second clock signal Sc2, and the selection terminal is used to receive a selection signal Sse1 to control the output terminal to output the first clock signal Sc1 or the second clock signal Sc2.

As shown in FIG. 1, the selection unit 124 can output one of the first clock signal Sc1 and the second clock signal Sc2 to the clock fan-out and attenuator circuit 126 to provide a processed clock signal to a core switch chip 128 and a programmable unit 129.

For example, the core switch chip 128 can include a specific application integrated circuit (ASIC). The programmable unit 129 can include a field programmable gate array (FPGA) and/or a complex programmable logic device (CPLD). As shown in FIG. 1, a controller 125 can be disposed on the circuit board 120 to control the core switch chip 128 and the programmable unit 129.

The first clock signal Sc1 can be used to support a precision time protocol, and the second clock signal Sc2 can be used to support a non-precision time protocol (non-PTP). For example, the first clock signal Sc1 can be used to support 5G communications and/or 6G communications, and the second clock signal Sc2 can be used to support applications related to the Ethernet network.

As shown in FIG. 1, when the predetermined interface 112 of the precision time protocol module 110 is not inserted into the socket 122 of the circuit board 120, the oscillator 123 of the circuit board 120 can provide the second clock signal Sc2 to the selection unit 124 for the output terminal of the selection unit 124 to output the second clock signal Sc2. When the predetermined interface 112 is inserted into the socket 122, the precision time protocol module 110 can provide the first clock signal Sc1 for the output terminal of the selection unit 124 to output the first clock signal Sc1.

Figure 2:
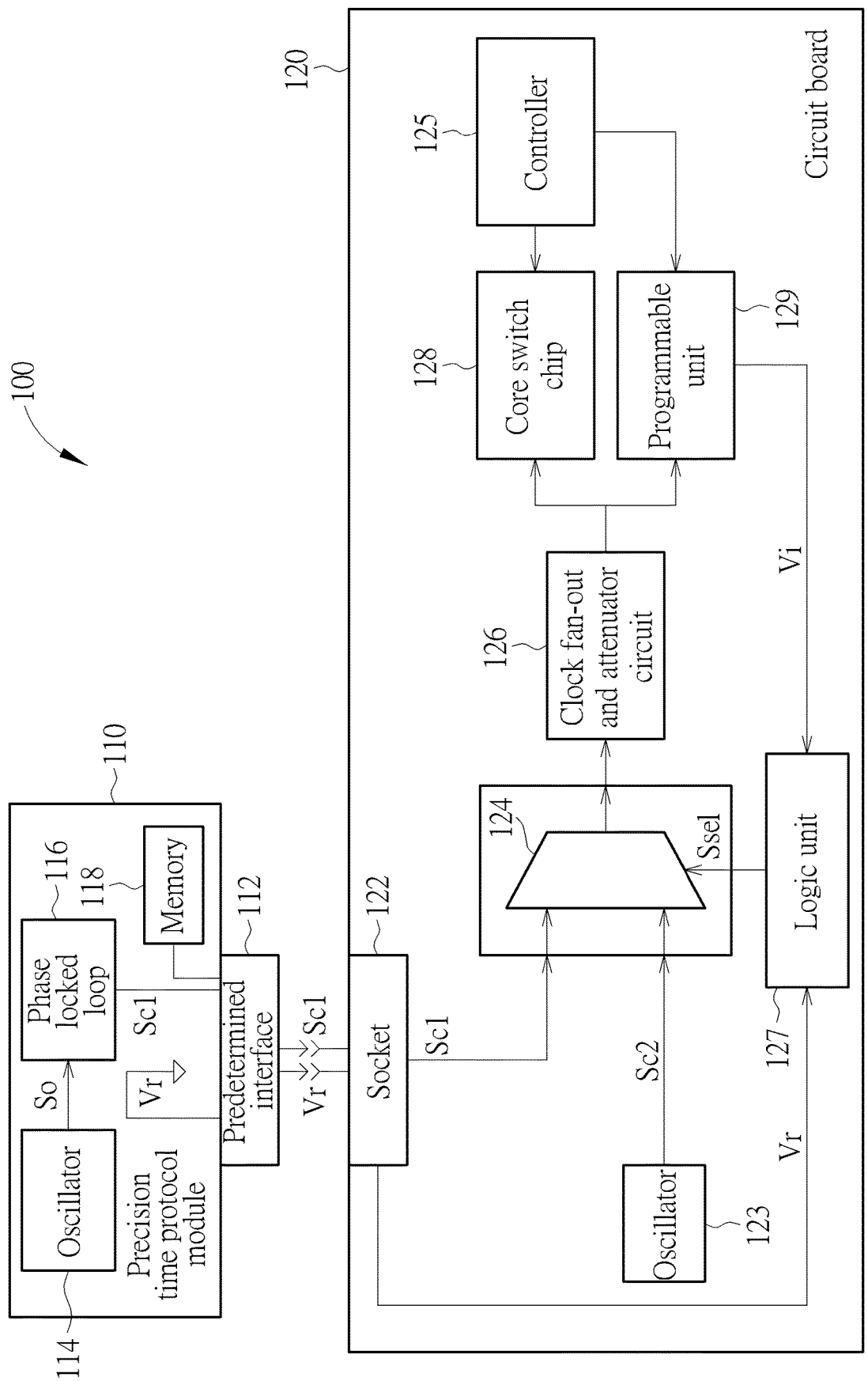
FIG. 2 illustrates the network switch of FIG. 1 according to an embodiment.

FIG. 2 illustrates the network switch 100 of FIG. 1 according to an embodiment. As shown in FIG. 2, the precision time protocol module 110 can include an oscillator 114 and a phase locked loop 116. The oscillator 114 can be used to provide a synchronous oscillation signal So. The phase locked loop 116 can be used to generate the first clock signal Sc1 according to the synchronous oscillation signal So.

As shown in FIG. 2, the precision time protocol module 110 can further include a reference voltage terminal used to receive a reference voltage signal Vr. The reference voltage signal Vr can have a substantially fixed signal level. For example, the reference voltage signal Vr can be a ground voltage signal with a voltage level that is 0 volts. The socket 122 can receive the first clock signal Sc1 and the reference voltage signal Vr when the predetermined interface 112 is inserted into the socket 122. As shown in FIG. 2, the circuit board 120 can further include a logic unit 127. When the predetermined interface 112 is inserted into the socket 122, the logic unit 127 can receive the reference voltage signal Vr to adjust a signal level of the selection signal Sse1 to control the output terminal of the selection unit 124 to output the second clock signal Sc2.

Figure 3:
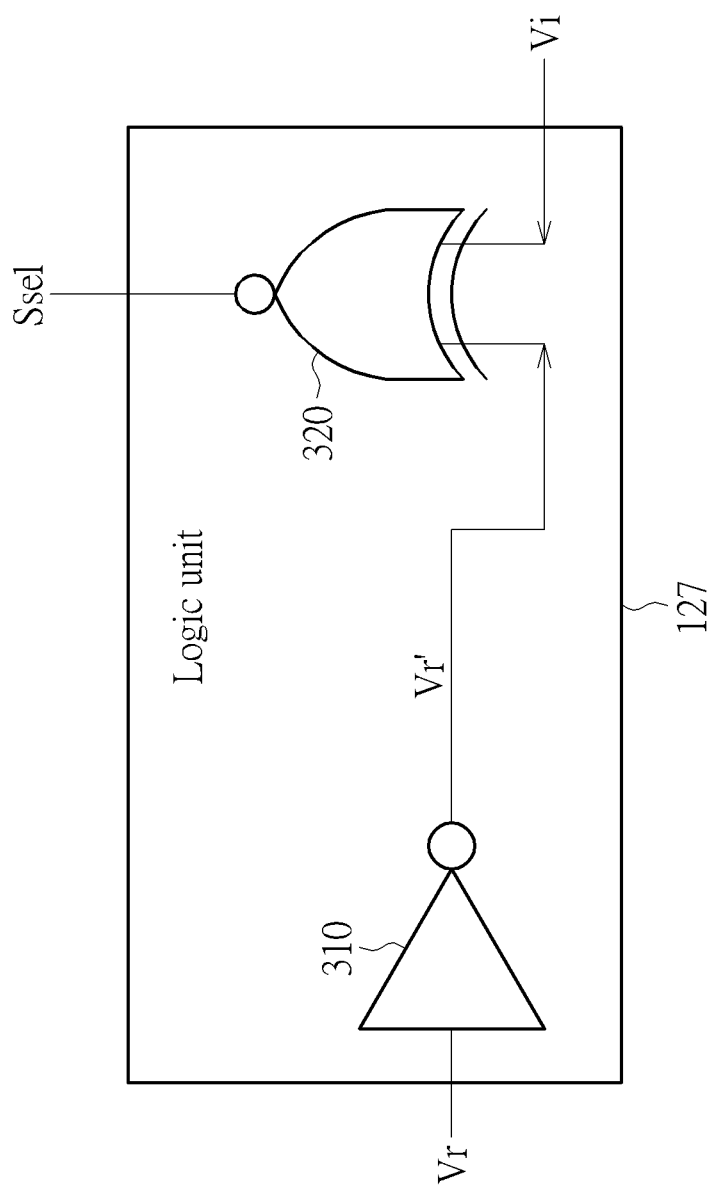
FIG. 3 illustrates the logic unit according to an embodiment.

FIG. 3 illustrates the logic unit 127 according to an embodiment. As shown in FIG. 3, the logic unit 127 can include an inverter 310 and an exclusive-OR (XOR) gate 320. As shown in FIG. 2 and FIG. 3, when the predetermined interface 112 is inserted into the socket 122, the inverter 310 can receive and invert the reference voltage signal Vr to generate an inverted signal Vr'. The reference voltage signal Vr can have a first signal level, and the inverted signal Vr' can have a second signal level complementary to the first signal level. The exclusive-OR gate 320 can include a first terminal, a second terminal and an output terminal, where the first terminal can receive the inverted signal Vr', the second terminal can receive an internal control signal Vi, and the output terminal can output the selection signal Sse1. For example, the internal control signal Vi can be generated and outputted by the programmable unit 129.

Here, the operation of the logic unit 127 is explained with an example. In the example, the first signal level of the reference voltage signal Vr is a low signal level, and the second signal level of the inverted signal Vr' is a high signal level. The reference voltage signal Vr can be a ground voltage signal corresponding to the low signal level and a logic 0. When the predetermined interface 112 is inserted into the socket 122, the inverter 310 can receive the reference voltage signal Vr to generate the inverted signal Vr', and the inverted signal Vr' can have the high signal level corresponding to a logic 1. The internal control signal Vi can have a proper signal level, such as the low signal level of the logic 0. Hence, when the first terminal of the exclusive-OR gate 320 receives the inverted signal Vr' corresponding to the logic 1, the selection signal Sse1 can have a proper signal level (e.g. the low signal level of the logic 0) to control the output terminal of the selection unit 124 to output the first clock signal Sc1. Here, the signal levels are examples, and the signal levels can be set according to design requirements.

Figure 4:
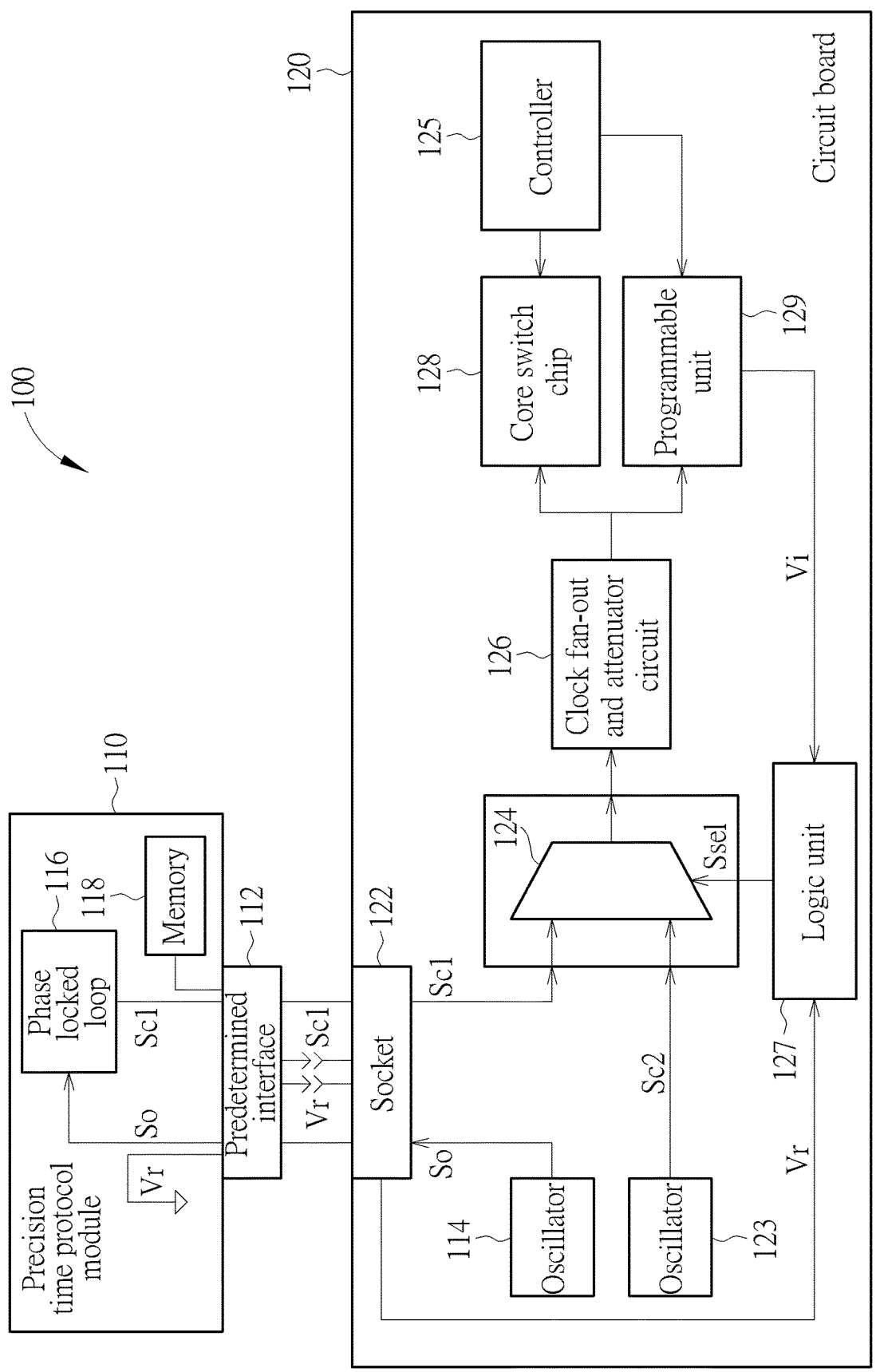
FIG. 4 illustrates the network switch in FIG. 1 according to another embodiment.

FIG. 4 illustrates the network switch 100 in FIG. 1 according to another embodiment. FIG. 4 can be similar to FIG. 2. However, in FIG. 4, the circuit board 120 can further include an oscillator 114 used to provide a synchronous oscillation signal So. In FIG. 4, the precision time protocol module 110 can further include a phase locked loop 116. The phase locked loop 116 can generate the first clock signal Sc1 according to the synchronous oscillation signal So when the predetermined interface 112 is inserted into the socket 122.

Here, FIG. 2 is compared with FIG. 4. In FIG. 2, the oscillator 114 and the phase locked loop 116 supporting the precision time protocol can be integrated in the precision time protocol module 110, hence the circuits related to the precision time protocol can be integrated into a module to effectively reduce the cost and complexity of the circuit board 120. In FIG. 4, since the oscillator 114 is disposed on the circuit board 120, the size of the precision time protocol module 110 can be reduced.

In FIG. 1, FIG. 2 and FIG. 4, the oscillator 123 can be a general oscillator. In FIG. 2 and FIG. 4, the oscillator 114 can include at least one of an oven controlled crystal oscillator (a.k.a. OCXO) and a temperature compensate crystal oscillator (a.k.a. TCXO).

The first clock signal Sc1 can be generated with the oscillator 114 supporting the precision time protocol. The second signal Sc2 can be generated with the oscillator 123 on the circuit board 120. The first clock signal Sc1 and the second signal Sc2 can be different. The oscillator 123 on the circuit board 120 can be a general oscillator with a lower price. The oscillator 114 can support the precision time protocol and be more costly. By using the structures in FIG. 1, FIG. 2 and FIG. 4, the same main board (e.g. 120) can be used in a network switch that does not need to support the functions of the precision time protocol, and the network switch can use the clock signal (e.g. Sc2) generated by the normal and cheaper oscillator (e.g. 123) on the main board.

Hence, the circuit board 120 can be a general-purpose circuit board. The functions of the precision time protocol and the non-precision time protocol can be flexibly supported by using or omitting the precision time protocol module 110. As shown in FIG. 1, FIG. 2 and FIG. 4, the circuit board 120 can include the controller 125. When the predetermined interface 112 is inserted into the socket 122, the controller 125 can perform a control process to perform a synchronous control operation. The control process can be corresponding to the oscillator 114 and the phase locked loop 116. For example, the controller 125 can perform controls related to the oscillator 114 and the phase locked loop 116 using suitable software(s) and/or firmware(s). For example, the controller 125 can include a central processing unit (CPU).

As shown in FIG. 1, FIG. 2 and FIG. 4, the precision time protocol 110 can further include a memory 118 used to store recognition data. The controller 125 can be further used to read the recognition data. The controller 125 can perform the control process to perform synchronous controls when the controller 125 determines that the recognition data is correct. For example, the memory 118 can include an electrically-erasable programmable read-only memory (EEPROM).

Since both the oscillator 114 and the phase locked loop 116 supporting the precision time protocol have to pass the relevant certification, and the oscillator 114 and the phase locked loop 116 provided by each vendor have to be controlled by specific programs, the oscillator 114 and the phase locked loop 116 should cooperate with one another when they are in use. If the oscillator 114 and the phase locked loop 116 are selected respectively, the complexity and difficulty of design and control will increase. In addition, it is difficult to design a circuit board that can support both the precision time protocol and the non-precision time protocol. By integrating the components related to the precision time protocol in the precision time protocol module 110 as shown in FIG. 1, FIG. 2 and FIG. 4, the complexity and difficulty of design and control are effectively reduced.

Through the structures in FIG. 1, FIG. 2 and FIG. 4, when the predetermined interface 112 of the precision time protocol module 110 is not inserted into the socket 122, the asynchronous control of the non-precision time protocol can be supported. When the predetermined interface 112 is inserted into the socket 122, the synchronous control of the precision time protocol can be supported. The structures provided by embodiments can provide designs of general-purpose main boards. Hence, a main board design can be used to support the precision time protocol related to telecommunication network switches or 5G communication edge network switches, and the same main board design can be used to support the non-precision time protocol related to enterprise network switches or data center network switches. It is not necessary to further design a specific main board for supporting the non-precision time protocol. As a result, the difficulty and complexity of design and operation are effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network switch, comprising:
a precision time protocol module configured to provide a first clock signal, and comprising an interface; and
a circuit board, comprising:
a socket configured to receive the first clock signal from the precision time protocol module when the interface of the precision time protocol module is inserted into the socket;
a first oscillator configured to provide a second clock signal; and
a selection unit comprising a first terminal configured to receive the first clock signal when the interface is inserted into the socket, a second terminal configured to receive the second clock signal, an output terminal configured to output one of the first clock signal and the second clock signal, and a selection terminal configured to receive a selection signal to control the output terminal to output the first clock signal or the second clock signal;
wherein the first clock signal is different from the second clock signal;
the interface of the precision time protocol module is used to permit insertion into the socket of the circuit board;
the first clock signal is used to support a precision time protocol; and
the second clock signal is used to support a non-precision time protocol.

2. The network switch of claim 1, wherein the precision time protocol module further comprises:
a second oscillator configured to provide a synchronous oscillation signal; and
a phase locked loop configured to generate the first clock signal according to the synchronous oscillation signal;
wherein the second oscillator is configured to support the precision time protocol.

3. The network switch of claim 2, wherein the second oscillator comprises at least one of an oven controlled crystal oscillator and a temperature compensate crystal oscillator.

4. The network switch of claim 2, wherein the circuit board further comprises a controller configured to perform a control process to perform a synchronous control operation, and the control process is corresponding to the second oscillator and the phase locked loop.

5. The network switch of claim 2, wherein:
the precision time protocol module further comprises a reference voltage terminal configured to receive a reference voltage signal having a substantially fixed signal level;
the socket is further configured to receive the reference voltage signal when the interface is inserted into the socket; and
the circuit board further comprises a logic unit configured to receive the reference voltage signal to adjust a signal level of the selection signal to control the output terminal of the selection unit to output the second clock signal when the interface is inserted into the socket.

6. The network switch of claim 5, wherein the logic unit comprises:
an inverter configured to receive and invert the reference voltage signal to generate an inverted signal when the interface is inserted into the socket; and
an exclusive-OR gate comprising a first terminal configured to receive the inverted signal, a second terminal configured to receive an internal control signal, and an output terminal configured to output the selection signal.

7. The network switch of claim 6, wherein the reference voltage signal has a first signal level, and the inverted signal has a second signal level complementary to the first signal level.

8. The network switch of claim 1, wherein:
the circuit board further comprises a second oscillator configured to provide a synchronous oscillation signal; and
the precision time protocol module further comprises a phase locked loop configured to generate the first clock signal according to the synchronous oscillation signal when the interface is inserted into the socket;
wherein the second oscillator is configured to support the precision time protocol.

9. The network switch of claim 8, wherein the second oscillator comprises at least one of an oven controlled crystal oscillator and a temperature compensate crystal oscillator.

10. The network switch of claim 8, wherein the circuit board further comprises a controller configured to perform a control process to perform a synchronous control operation, and the control process is corresponding to the second oscillator and the phase locked loop.

11. The network switch of claim 10, wherein:
the precise time protocol module further comprises a memory configured to store recognition data; and
the controller is further configured to read the recognition data, and the controller performs the control process when the recognition data is correct.

12. A circuit board, comprising:
a socket configured to receive a first clock signal from an interface of a precision time protocol module when the interface of the precision time protocol module is inserted into the socket;
a first oscillator configured to provide a second clock signal; and
a selection unit comprising a first terminal configured to receive the first clock signal when the interface is inserted into the socket, a second terminal configured to receive the second clock signal, an output terminal configured to output one of the first clock signal and the second clock signal, and a selection terminal configured to receive a selection signal to control the output terminal to output the first clock signal or the second clock signal;
wherein the first clock signal is different from the second clock signal;
the interface of the precision time protocol module is used to permit insertion into the socket of the circuit board;
the first clock signal is used to support a precision time protocol; and
the second clock is used to support a non-precision time protocol.

13. The circuit board of claim 12, wherein:
the socket is further configured to receive a reference voltage signal when the interface is inserted into the socket; and
the circuit board further comprises a logic unit configured to receive the reference voltage signal to adjust a signal level of the selection signal to control the output terminal of the selection unit to output the second clock signal when the interface is inserted into the socket.

14. The circuit board of claim 13, wherein the logic unit comprises:
an inverter configured to receive and invert the reference voltage signal to generate an inverted signal when the interface is inserted into the socket; and
an exclusive-OR gate comprising a first terminal configured to receive the inverted signal, a second terminal configured to receive an internal control signal, and an output terminal configured to output the selection signal.

15. The network switch of claim 13, wherein:
the circuit board further comprises a second oscillator configured to provide a synchronous oscillation signal;
when the interface is inserted into the socket, the synchronous oscillation signal is provided through the interface and the first clock signal is received; and
the second oscillator is configured to support the precision time protocol.

* * * * *